US008849712B2

(12) United States Patent
Nyhoff et al.

(10) Patent No.: US 8,849,712 B2
(45) Date of Patent: Sep. 30, 2014

(54) EXCHANGE-TRADED BASIS DERIVATIVE CONTRACTS

(75) Inventors: John Nyhoff, Darien, IL (US);
Frederick Sturm, Chicago, IL (US);
Michael Kamradt, Flossmoor, IL (US);
John Labuszewski, Westmont, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 0 days.

(21) Appl. No.: 13/452,425

(22) Filed: Apr. 20, 2012

(65) Prior Publication Data

US 2013/0282547 A1 Oct. 24, 2013

(51) Int. Cl.
*G06Q 40/00* (2012.01)
(52) U.S. Cl.
USPC .............................................. 705/37; 705/35
(58) Field of Classification Search
USPC ................................................... 705/35–45
See application file for complete search history.

(56) References Cited

U.S. PATENT DOCUMENTS

| 6,862,580 B1 | 3/2005 | Ford |
| 7,577,606 B1 | 8/2009 | Ford |
| 7,624,062 B1 | 11/2009 | Kelly et al. |
| 7,870,060 B2 | 1/2011 | Barker et al. |
| 2004/0143525 A1 * | 7/2004 | Nishimaki ............ 705/35 |
| 2011/0295726 A1 | 12/2011 | Mueller et al. |

OTHER PUBLICATIONS

Managing Financial Risk: A Guid to Derivative Products, Financial Engineering, and Value Maximization by Charles W. Smithson, McGraw-Hill, 1998.*

* cited by examiner

*Primary Examiner* — Richard C Weisberger
(74) *Attorney, Agent, or Firm* — Banner & Witcoff, Ltd.

(57) ABSTRACT

An exchange computer system creates, trades and/or otherwise manages basis derivative contracts. At maturity, a basis derivative contract may have two components. A first component may require a party to the basis derivative contract to make or take some type of delivery related to a particular subject matter. A second component may require the basis derivative contractee to accept a further obligation under one or more derivative contracts related to the subject matter.

21 Claims, 4 Drawing Sheets

EXCHANGE-TRADED BASIS DERIVATIVE CONTRACTS

BACKGROUND

"The basis" is a term sometimes used to describe the difference between the value of a particular type of property and a future value of that property. For example, many traders and other market participants may actively monitor the basis of securities such as government-issued bonds or other obligations. They may monitor this difference by following the price of the current cash or "spot" price for a security and the current price of a futures contract for the same security. This difference can be actively monitored, and in many instances may be traded.

To date, however, known basis trading has generally involved separately conducting multiple transactions. For example, persons wishing to trade the basis in a security typically do so by purchasing (or selling) the security and by then separately entering into a short (or long) position in a security futures contract. In addition to inconvenience and inefficiency, this approach subjects a trader to market slippage and other disadvantages. In some cases, cash market treasury dealers will quote the basis to their customers directly. Although this permits the customer to trade the basis at one price (from the customer's perspective), the positions must still be broken out into the cash and futures positions by the dealer or by others on the dealer's behalf, thereby leaving the customer indirectly subject to slippage and other disadvantages.

SUMMARY

This Summary is provided to introduce a selection of concepts in a simplified form that are further described below in the Detailed Description. This Summary is not intended to identify key or essential features of the invention.

In at least some embodiments, an exchange computer system creates, trades and/or otherwise manages basis derivative contracts. A basis derivative contract may allow a party to trade the basis with regard to a basis subject matter, or with regard to multiple subject matters. For example, a basis derivative contract may allow a party to trade, using a single contract, the difference between the cash or spot price of a particular subject matter and a futures price, or an adjusted future price, of that subject matter.

At maturity, a basis derivative contract may have two components. A first component may require a party to the basis derivative contract to make or take some type of delivery related to a basis subject matter. A second component may require the basis derivative contractee to accept a further obligation under one or more derivative contracts related to the subject matter or related to another subject matter.

In at least some embodiments, a request may be received at a computer system to create a basis derivative contract corresponding to one or more basis subject matters. In response to the received request, the computer system may generate and store data corresponding to the requested basis derivative contract. The stored data may include deliverable data identifying an obligation for delivery, on or by a future date, of one or more instances of at least one of the basis subject matters or a monetary value based on one or more instances of at least one of the basis subject matters. The stored data may also include derivative data identifying an obligation for acceptance, on or by the future date, of further obligations under one or more derivative contracts based on at least one of the basis subject matters. The computer system may transmit data indicating entry into the requested basis derivative contract.

Embodiments include methods for creating and/or trading and/or managing a basis derivative contract, computer systems configured to perform such methods, and computer-readable media storing instructions that, when executed, cause a computer system to perform such methods.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Various embodiments may comprise a method, a computer system, and/or a computer program product. Accordingly, one or more aspects of one or more of such embodiments may take the form of an entirely hardware embodiment, an entirely software embodiment and/or an embodiment combining software and hardware aspects. Furthermore, such aspects may take the form of a computer program product stored by one or more non-transitory computer-readable storage media having computer-readable program code, or instructions, embodied in or on the storage media. The term "computer-readable medium" or "computer-readable storage medium" as used herein includes not only a single medium or single type of medium, but also a combination of one or more media and/or types of media. Such a non-transitory computer-readable medium may store computer-readable instructions (e.g., software) and/or computer-readable data (i.e., information that may or may not be executable). Any suitable computer readable media may be utilized, including various types of non-transitory computer readable storage media such as hard disks, CD-ROMs, optical storage devices, magnetic storage devices, and/or any combination thereof.

Aspects of method steps described in connection with one or more embodiments may be executed on one or more processors associated with a computer system (such as exchange computer system 100 described below). As used herein, a "computer system" could be a single computer or could comprise multiple computers. When a computer system comprising multiple computers performs a method, various steps could be performed by different ones of those multiple computers. Processors of a computer system may execute computer-executable instructions stored on non-transitory computer-readable media. Embodiments may also be practiced in a computer system forming a distributed computing environment, with tasks performed by remote processing devices that are linked through a communications network. In a distributed computing environment, program modules may be located in both local and remote computer storage media including memory storage devices.

Exemplary Operating Environment

Figure 1:
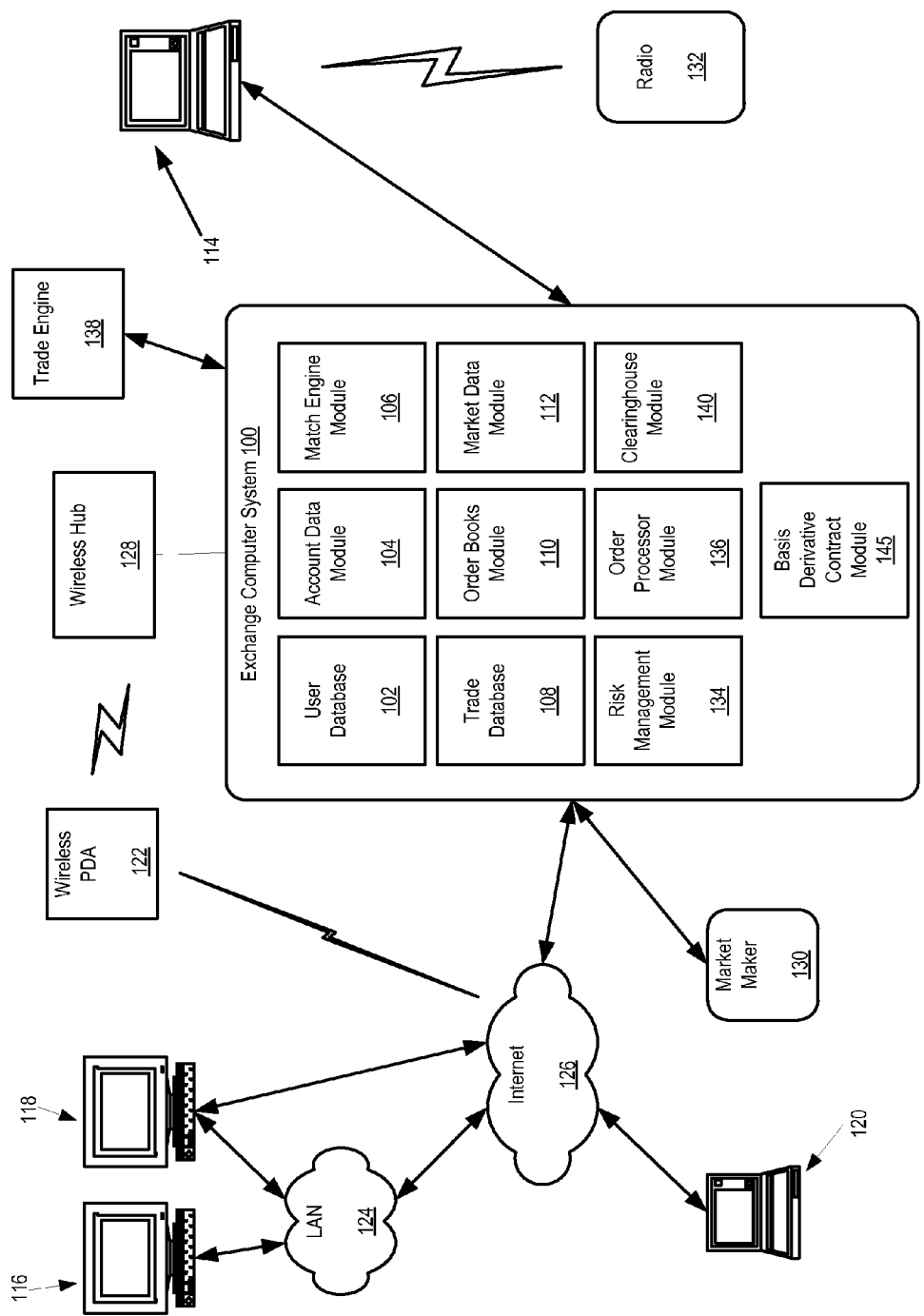
FIG. 1 shows an exemplary trading network environment for implementing trading systems and methods according to at least some embodiments.

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods that create, trade and/or otherwise manage basis derivative contracts such as are discussed in more detail below.

Computer system 100 can be operated by a financial exchange. In addition to basis derivative contracts as described below, other products of the financial exchange may include, without limitation, futures contracts, options contracts, and other types of derivative contracts. Computer system 100 receives orders for exchange products, transmits market data related to orders and trades to users, and performs other operations associated with a financial exchange. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to store and/or compute (or otherwise determine) current bid and offer prices. A market data module 112 may be included to collect market data, e.g., data regarding current bids and offers for futures contracts, options and other derivative products, including but not limited to basis derivative contracts. Module 112 may also prepare the collected market data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

A clearinghouse module 140 may be included as part of exchange computer system 100 and configured to carry out clearinghouse operations. Module 140 may receive data from trade database 108 regarding trades of futures contracts, basis derivative contracts and other financial products and facilitate the financial exchange acting as one of the parties to every traded contract or other product. For example, computer system 100 may match an offer by party A to sell an exchange product with a bid by party B to purchase a like exchange product. Module 140 may then create an exchange product between party A and the financial exchange and an offsetting second exchange product between the financial exchange and party B. Module 140 may also be configured to perform other clearinghouse operations. As another example, module 140 may maintain margin accounts for member brokers. In those accounts, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc.

A basis derivative contract module 145 may also be included in computer system 100. Module 145 may interface with other modules of exchange computer system 100 and perform various data collection, calculation and other operations associated with creating, trading and otherwise managing basis derivative contracts. Exemplary basis derivative contracts and operations associated with their creation, trading and other management are discussed below.

Each of modules 102 through 145 could be separate software components executing within a single computer, separate hardware components (e.g., dedicated hardware devices) in a single computer, separate computers in a networked computer system, or any combination thereof (e.g., some computers in a networked system may execute software modules corresponding more than one of modules 102-145).

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on non-transitory computer-readable media. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

In at least some embodiments, exchange computer system 100 is used to create, trade and/or otherwise manage basis derivative contracts. A basis derivative contract allows a party to trade "the basis" with regard to a particular subject matter. For example, a basis derivative contract may allow a party to trade, using a single contract, the difference between the cash or "spot" price of a particular subject matter and an adjusted future price of that subject matter.

At maturity, a basis derivative contract will have two components. A first component may require a party to the basis derivative contract, i.e., the basis derivative contractee, to make or take delivery of a specified quantity and quality of commodity, security or other investible instrument (which instrument could include an OTC instrument) related to a basis subject matter. A second component may require the basis derivative contractee to accept a further obligation under one or more derivative contracts related to the subject matter. For simplicity, these components will be called the deliverable component and the derivative component.

Although each basis derivative contact has at least one subject matter, basis derivative contacts according to some embodiments can have multiple subject matters. Such embodiments are discussed below. For convenience, basis derivative contacts will initially be described using examples in which there is a single basis subject matter. Possible subject matters of a basis derivative contract can include, without limitation, any of the following: an agricultural commodity, an energy commodity, a metals commodity, another type of commodity, a government issued-security (e.g., a United States Treasury Bill or Note), a non-government security (e.g., a bond or stock issued by a corporation), a currency, or another derivative instrument.

Upon entry into a basis derivative contract, the basis derivative contractee will have either a long or short position in that basis derivative contract. The deliverable component of a long position will obligate the contractee, at or after contract maturity, to take "delivery" of the subject matter. The derivative component of the long position will obligate the contractee to take a short position in one or more derivative contracts based on the subject matter. A short position will obligate contractee, at or after contract maturity, to make delivery of the subject matter and to also take a long position in one or more derivative contracts based on the subject matter. Depending on the subject matter at issue and on the terms of a specific basis derivative contract, delivery can take various forms. In some cases, delivery might require physical delivery of one or more instances of the subject matter. Alternatively, delivery might be the payment of a monetary value (e.g., an amount of United States dollars or other currency) that is calculated based on one or more instances of the subject matter.

In some embodiments, the derivative component of a basis derivative contract may include one or more futures contracts that mature after maturity of the basis derivative contract. The maturity dates of those futures contracts could be days, weeks, months or years after the maturity date of the basis derivative contract. Upon maturity of a basis derivative contract according to some such embodiments, a long contractee would take delivery of the subject matter and would accept a short position in one or more futures contracts for the subject matter. Similarly, a short contractee according to some such embodiments would make delivery of the subject matter at maturity of the basis derivative contract and would accept a long position in one or more futures contracts for the subject matter.

As with futures contracts and other types of derivative contracts, a basis derivative contractee might effectively dispose of the contract prior to maturity by offsetting the contract with another basis derivative contract. For example, a holder of a long position in a particular type of basis derivative contract maturing on date X might offset that long position by also entering into a short position in another basis derivative contract of that same type also maturing on date X.

Figure 2:
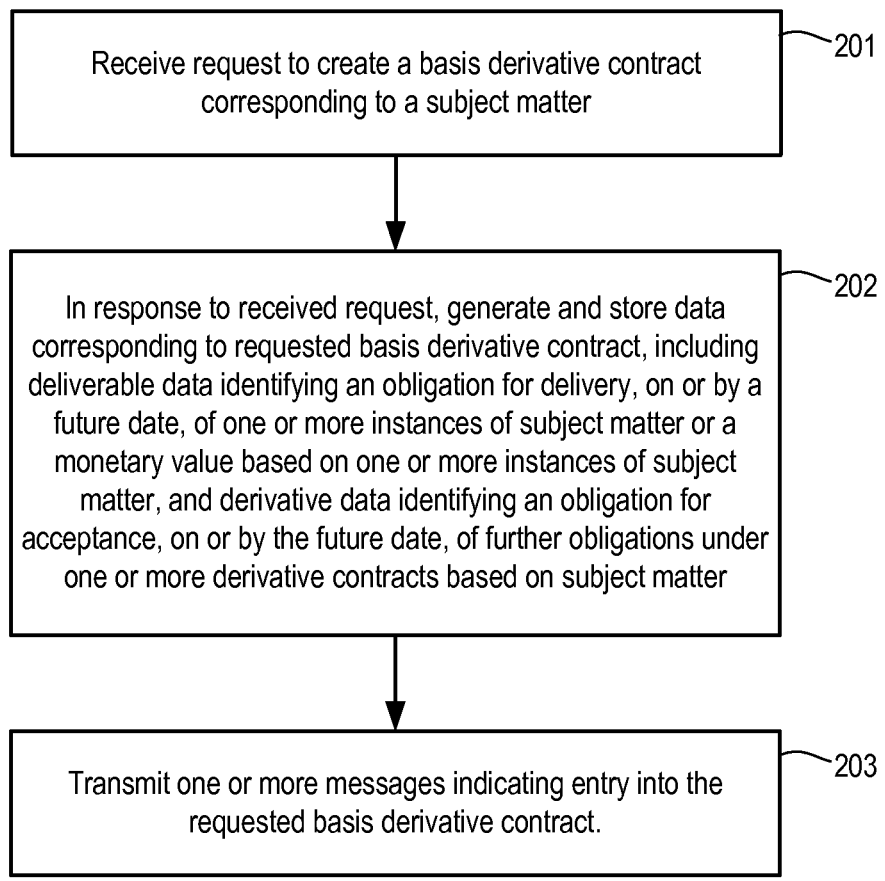
FIG. 2 is a flow chart showing operations performed by an exchange computer system in connection with creation of a basis derivative contract according to some embodiments.

FIG. 2 is a flow chart showing operations performed by exchange computer system 100 in connection with creation of a basis derivative contract according to some embodiments. The operations of FIG. 2 apply to either long or short basis derivative contracts. In step 201, system 100 (e.g., module 145) receives a request to create a basis derivative contract corresponding to a particular basis subject matter. One or more other modules of computer system 100 may have already received an order from a broker or other exchange customer to seeking enter into a basis derivative contract. That order from the customer may have been matched with a corresponding order from another customer (e.g., by module 106). As result of this matching, the request to create the basis derivative contract, i.e., the request of step 201, may have been sent.

In step 202, system 100 generates and stores data corresponding to the requested basis derivative contract. The data can be generated, e.g., in module 145 and stored, e.g., in clearinghouse module 140. System 100 may generate data in step 202 based on parameters in the request received in step 201 and based on basis derivative contract type definition data stored in module 145. That type definition data can include, for each of multiple basis derivative contract types, one or more of the following: the basis subject matter, the type of delivery (e.g., whether physical or by payment of monetary value of subject matter), the future date on or by which delivery and entry into derivative contract(s) should occur, the terms of delivery to be performed at maturity, the type and terms of the derivative contract obligation to be assumed at maturity, and other terms of the basis derivative contract.

The data generated and stored in step 202 can include contract maturity date. The data can also include data relating to the deliverable component. This deliverable data can include data that identifies an obligation for delivery, on or by a future date, of one or more instances of the subject matter. The obligation for delivery may be an obligation to accept delivery (and in some cases, pay a contract invoice price) if the basis derivative contractee is a long party. Conversely, the obligation for delivery may be an obligation to make delivery (and in some cases, accept a contract invoice price) if the basis derivative contractee is a short party. The manner in which delivery is made will vary based on the type of subject matter at issue and on the terms of the particular basis derivative contract. In some cases, actual physical delivery of the subject matter may be required. This may require physical delivery of a quantity of a commodity, delivery of warehouse receipts or of other documents transferring ownership of goods, delivery of securities, bonds or other instruments, a book entry indicating transfer of a security, etc. What constitutes an "instance" of a subject matter will also depend on the subject matter in question and on the terms of a particular contract. As one example, and if the subject matter is a particular commodity, an instance could be a particular quantity of that commodity. As another example, an instance could be a particular par value version of a subject matter government-issued security.

In some embodiments, and depending on the terms of the basis derivative contract, delivery may require payment of a monetary sum in lieu of physical delivery of the subject matter. This monetary sum might be the value of one or more instances of the subject matter as of the delivery date (or as of some other defined date), or may be based in some other manner on one or more instances of the subject matter.

The future date identified in the deliverable data may be the same as the maturity date of the basis derivative contract. This need not be the case, however. The deliverable data may indicate that delivery is to be made on a predefined date after the maturity date. Alternatively, the deliverable data may specify that delivery occur by a particular date, or within a particular range of dates that extends after the maturity date. For example, the deliverable data could indicate that delivery should occur within the first 5 business days following the maturity date.

The data generated and stored in step 202 can further include data relating to the derivative component. Such data can include data that identifies an obligation for acceptance, on or by the future date, of a further obligation under one or more derivative contracts based on the subject matter. This data can include specifics of the derivative contracts such as type of contract, contract terms, contract maturity date, etc. In at least some embodiments, the deliverable data will indicate that the further obligation under the one or more derivative contracts will be effective as of the same date delivery is effected.

The further obligation under one or more derivative contracts may, in the case of a long basis derivative contractee, be as a short party to one or more derivative contracts based on the subject matter. For a short basis derivative contractee, the further obligation may be as a long party to one or more derivative contracts based on the subject matter. As indicated above, in some embodiments a derivative contract of the derivative component may be a futures contract.

In some embodiments, the derivative component of the basis derivative contract includes more than one contract. In this manner, the value of the derivative component can better offset the value of the deliverable component. The number of contracts in the derivative component is also calculated as part of generating the derivative component data. The manner of making this calculation will depend on the type of basis derivative contract at issue. For example, a gold basis futures contract might require a holder of a long position to accept delivery of 1000 ounces of gold at maturity and to accept short positions in ten gold futures contracts, each of which is based on 100 ounces of gold. A holder of a short position in such a gold basis futures contract might be required to accept delivery of 1000 ounces of gold and ten long positions in 100 ounce gold futures contacts. For basis derivative contracts in which the subject matter is United States Treasury securities and the derivative component includes Treasury-issued securities futures contracts, the number of futures contracts in the derivative component can be based on a conversion factor (CF). This is described more fully in connection with the Detailed Example below.

In step 203, and as result of completion of step 202, computer system 100 may transmit one or more messages to a broker or other exchange customer indicating entry into the requested basis derivative contract.

Figure 3:
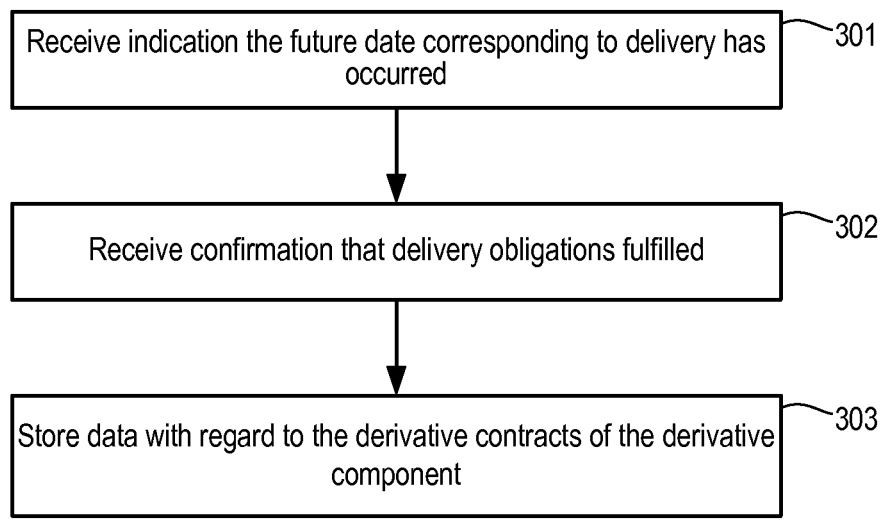
FIG. 3 is a flow chart showing operations performed by an exchange computer system in connection with maturity of a basis derivative contract according to some embodiments.

FIG. 3 is a flow chart showing operations performed by exchange computer system 100 in connection with maturity of a basis derivative contract according to some embodiments. The operations of FIG. 3 also apply to either long or short basis derivative contracts. In step 301, system 100 (e.g., module 145) receives an indication that the future date corresponding to delivery for a specific basis derivative contract has occurred. In step 302, system 100 receives confirmation that the contractee of that specific basis derivative contract has fulfilled its obligation under the delivery component of the contract. If step 302 is performed by module 145, the confirmation received in step 302 could be received, e.g., by an interface with clearinghouse module 140. The confirmation of step 302 verifies that the contractee has either provided physical delivery or made appropriate monetary payment (if the contractee is short), or has taken physical delivery and paid any required invoice price (if the contractee is long). In some embodiments, if a basis derivative contractee does not fulfill the delivery component of the contract, the contractee if not permitted to participate in the derivative component, or vice versa. Stated differently, a default on one component would be treated as a complete default of the basis derivative contract.

In step 303, system 100 stores data (e.g., in clearinghouse module 140) with regard to the derivative contracts of the derivative component of the basis derivative contract. That data can include the number and type of derivative contracts, as well as the position (i.e., long or short) of the party to the contracts. That data may also assign an initial value to each of the contracts. That value can then be used and adjusted, e.g., in connection with daily mark-to-market settlement and final settlement of those contracts.

In at least some embodiments, the assigned value of the derivative component may be based, at least in part, on the value of the deliverable component. For example, if the total value of the delivered subject matter is N U.S. dollars ($N), then the derivative component may be assigned a nominal or notional value of $N. If the derivative component consists of r contracts, where r is an arbitrary integer, then in some embodiments each of those contracts could be assigned a value of $N/r in step 303. In other embodiments, one or more factors f could be calculated and applied to the notional value of the derivative component. These factors could be used, e.g., to account for differences in risks associated with the deliverable and derivative components, and/or to account for differences in risk among individual contracts in the derivative component. In some embodiments, for example, individual derivative contracts in the derivative component might have values $(f_1)N, (f_2)N, (f_3)N, \ldots (f_n)N$, etc., where some or all of $f_1, f_2, f_2$ and $f_n$ are different. The sum of $(f_1)N+(f_2)N+(f_3)N \ldots +(f_n)N$ may or may not equal N. The entire nominal value of the derivative component may not be evenly spread over all contracts of the derivative component. Such non-even spreading could be combined with use of different factors applied to individual contracts or groups of contracts in the derivative component.

Some examples thus far have assumed a basis derivative contract with a single subject matter, i.e., with the deliverable component requiring delivery of one or more instances of that single subject matter and with the derivative component requiring entry into further obligations under derivative contracts based on that same subject matter. This need not be the case, however. In some embodiments, for example, one subject matter may apply to the deliverable component and another subject matter might apply to the derivative component. This could be useful in cases where traders note a correlation between two subject matters. By way of illustration, a trader might detect a correlation between gold and platinum markets, and thus desire to trade a gold/platinum basis futures contract. Such a contract might call for delivery of gold and assumption of a futures contract obligation in a platinum futures contract. At maturity, a long party to a gold/platinum basis futures contract would take delivery gold and accept short positions in one or more platinum futures contracts. A short party to such a basis futures contract would deliver gold at maturity and accept long positions in one or more platinum futures contracts. Of course, this is only one example, and innumerable other types of basis derivative contracts having multiple subject matters could be created. Moreover, such contracts need not be limited to two subject matters. For example, a basis derivative contract could require delivery with regard to more than one type of subject matter and/or assumption of a further obligation under one or more derivative contracts ("a basket" of components) based on more than one type of subject matter.

Figure 4:
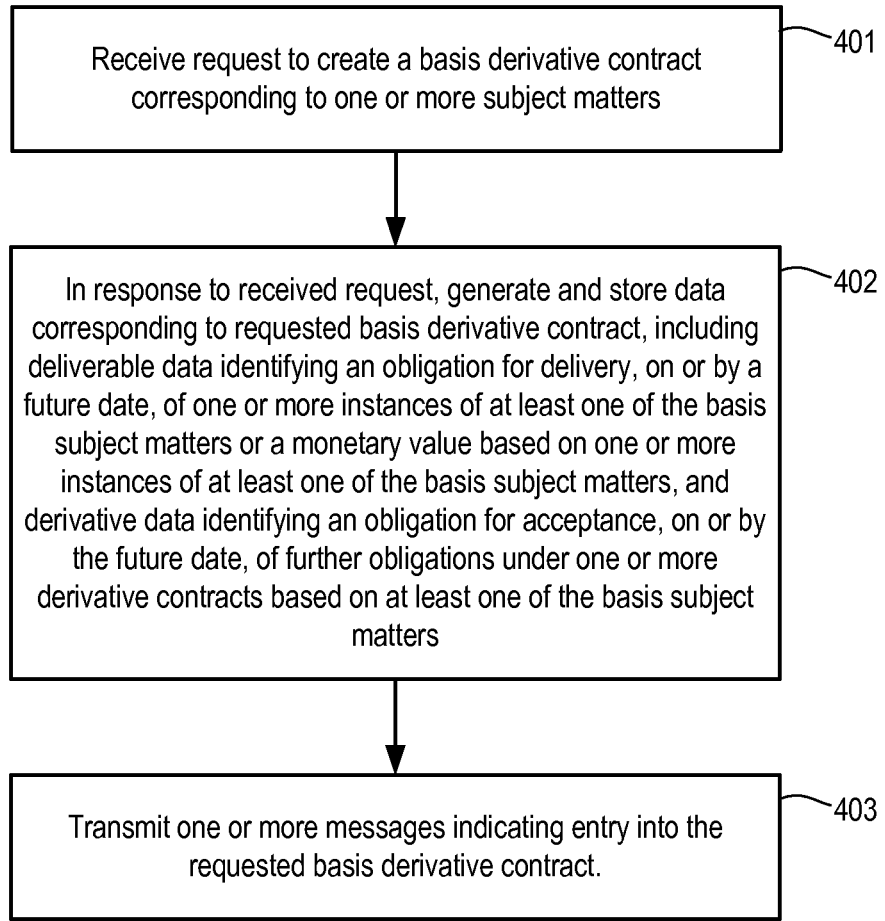
FIG. 4 is a flow chart showing operations performed by an exchange computer system in connection with creation of a basis derivative contract according to some embodiments in which there may be multiple basis subject matters.

The previous description and drawings of embodiments directed to creation, trading and management of basis derivative contracts having one basis subject matter are readily extensible to embodiments having multiple basis subject matters. For example, FIG. 4 is a flow chart showing operations performed by an exchange computer system in connection with creation of a basis derivative contract according to some such embodiments. Steps 401-403 are similar to steps 201-203 of FIG. 2, but have been modified slightly to indicate the possible presence of multiple basis subject matters.

In many embodiments, the derivative component of a basis derivative contract will comprise futures contracts. However, the derivative component could include other types of derivative contracts. Examples of other types of derivative contracts that could be included include, without limitation, interest rate swaps (IRS), credit default swaps (CDS), commodity swaps, total return equity swaps or other varieties of over-the-counter (OTC) instruments.

Detailed Example

As previously indicated, some embodiments include basis derivative contracts in which the subject matter is a security or collection of securities issued by the United States Treasury. Such securities include the classes of securities often called "T-notes" and "T-bonds." Such embodiments, which will be called Treasury basis futures contracts for convenience, can provide a facility for entry into a basis trade. What follows is a detailed description of Treasury basis futures contracts and related concepts. Although the following description refers to products of CME Group Inc. ("CME Group") of Chicago, Ill., USA, such references are only for purpose of example.

If a party purchases a Treasury basis futures contract and stands long for delivery, that party receives delivery of a long position in a specifically identified Treasury security and an appropriately balanced short position in CME Group Treasury futures contracts. If a party sells a Treasury basis futures contract and stands short for delivery, the party is required to deliver a specifically identified Treasury security and is assigned an appropriately balanced long position in CME Group Treasury futures contracts. The position in Treasury futures contracts is appropriately balanced by adjusting the number of such contracts in the derivative contract leg.

In order to understand that how that balancing is performed, as well as other aspects of Treasury basis futures contracts, it is helpful to review some fundamental concepts associated with Treasury futures contracts. This includes the conversion factor (CF) invoicing system used by CME Group and its pricing implications.

The conversion factor (CF) invoicing system was designed to accommodate the delivery of a wide range of Treasury securities under a Treasury futures contract. For example, a CME Group 10-year T-note futures contract might call for delivery of Treasury securities with remaining maturities ranging from 6½ to 10 years. In other words, Treasury securities with 6½ to 10 years in remaining maturity would be considered "eligible for delivery" under such a futures contract. As another example, a CME Group Ultra T-bond futures contract calls for the delivery of Treasury securities with remaining maturities of 25 years or longer. In that case, Treasury securities with 25+ years in remaining maturity are considered "eligible for delivery."

As can be seen from these examples, a short party under a Treasury securities futures contract may elect to make delivery of any of a wide range of securities that may vary widely in terms of coupon and/or maturity. Because securities with varying coupon and maturities command different value in the market, the CF invoicing scheme was developed and is applied. Under this scheme, the invoice price that the long pays to the short upon delivery of securities is the product of the prevailing futures price, the conversion factor (CF) and $1,000 (which reflects the $100,000 face value futures contract size). This is set forth in Eq. 1.

Principle Invoice Amount=Futures Price×CF×$1000  Eq. 1

To further illustrate Eq. 1, the principle invoice amount for delivery of a 2¾% Treasury maturing in February 2018 ("2¾%-18 Treasury") on a June 2011 10-year T-note futures contract can be calculated as $98,255.85. This is based upon the prevailing June 2011 10-year T-note futures contract price of 118$^{25}$/32nds (or 118.78125) as of Mar. 29, 2011. The conversion factor was 0.8272, which implies that this security (i.e., the 2¾%-18 Treasury) should trade at roughly 83% of par if it were to yield 6%. As another illustration of Eq. 1, the principle invoice amount for delivery of a 2⅝% Treasury maturing in November 2020 ("2⅝%-20 Treasury") on a June 2011 10-year T-note futures may be calculated as $90,630.09. The conversion factor was 0.7630, which implies that this security (i.e., the 2⅝%-20 Treasury) should trade at roughly 76% of par if it were to yield 6%. Regardless of which security is delivered in satisfaction of the Treasury futures contract, and in addition to the principle invoice amount, the long would also be required to compensate the short for interest accrued on the delivered security since the last semi-annual interest payment date.

The conversion factor would be different for every security. The CF associated with a particular security is calculated as the price of the security, in view of its coupon and maturity, to yield 6%. That 6% may be referred to as the "futures contract standard" or the implicit coupon associated with the futures contract. As such, futures contracts tend to price akin to a 6% coupon security. Tables of conversion factors are periodically calculated and published by CME Group for numerous Treasury securities.

A 6% coupon is entirely arbitrary and is generally established at levels reflective of current market conditions. However, conditions do change. While Treasury futures currently utilize a 6% contract standard, they were originally designed with an 8% contract standard.

Cheapest-to-deliver is another concept that is relevant. By comparing the prevailing price of a Treasury security in the cash markets with the invoice amount one would receive by making delivery on a futures contract, one may calculate the explicit gain or loss realizable through the delivery process. For example, the 2¾%-18 Treasury was priced at 99²²⁄₃₂nds (or 99.0703125 expressed in decimal form) as of Mar. 29, 2011. This equates to $99,070.31 per $100,000 face value unit. If one were to pay that amount to purchase the cash security and receive the principle invoice amount of $98,255.85 upon delivery, that implies a loss of $814.46 upon delivery. The 2⅝%-20 Treasury was priced at 93-006 (93.0234375) as of Mar. 29, 2011, or $93,023.44 per $100,000 face value unit. If one were to make delivery of this security and receive the principle invoice amount of $90,630.09, that implies a loss of $2,393.35. Table 1 shows these values.

TABLE 1

Profit/Loss Upon Delivery

| Security | 2-3/4%-18 Treasury | 2-5/8%-20 Treasury |
| --- | --- | --- |
| Principle Invoice Amount | $98,255.85 | $90,630.09 |
| Cash Price | ($99,070.31) | ($93,023.44) |
| Gain (Loss) on Delivery | ($ 814.46) | ($ 2,393.35) |

Clearly if the short has the choice of delivering either of these two securities, the short would opt for the one which generates the greatest gain or lowest loss upon delivery. In this case, that is the 2¾%-18 Treasury. If one were to make a similar analysis for all eligible for delivery securities, one may identify the so-called "cheapest-to-deliver" (CTD) or most economical to deliver security as the one which generates the most favorable outcome upon delivery. Application of the CF invoicing system would ideally render equally economic the delivery of any eligible for delivery security. Practically, however, a single security stands out as cheapest or most economical to delivery. As a general rule, when yields are in excess of the 6% futures contract standard, the cheapest-to-deliver (CTD) security will be a long duration (long maturity, low coupon) security. When yields are less than the 6% futures contract standard, the CTD security will tend to be a short duration (short maturity, high coupon) security.

If yields were at the 6% futures contract standard, these "conversion factor biases" are (theoretically) muted and all eligible-for-delivery securities may be equally economic to deliver. Practically, however, "cash market biases" tend to exert themselves under these conditions and less desirable securities will stand out as CTD. For example, low-coupon securities tend to be more highly valued with lower yields than high-coupon securities as a general rule. The "liquidity premium" associated with more recently delivered securities tends to drive them to a premium vs. seasoned securities.

Futures contracts tend to price, or track or correlate most closely with the CTD security. In a low yield environment, this can imply that futures tend to price low duration securities that may be the most well seasoned of all securities within the "delivery window." However, market participants are typically more interested in recently issued securities that continue to be very actively traded. Basis trading is frequently based upon an assessment of what security is currently CTD and what might become CTD as conditions change. In order to understand, consider the "basis."

One way of identifying the basis associated with any particular Treasury security is by comparing the spot or cash price of the security with the Treasury futures price adjusted by reference to the security's conversion factor (CF). This is shown in Eq. 2

$$\text{Basis} = \text{Spot Treasury Price} - (\text{Treasury Futures Price} \times \text{CF}) \qquad \text{Eq. 2}$$

Note that this calculation is analogous to the analysis of what is CTD to the extent that there is a comparison of the price of the spot Treasury to the "adjusted" Treasury futures price, i.e., the Treasury futures price is multiplied or adjusted by reference to the CF. But unlike the previous analysis where the result was expressed in dollars and cents, the basis is generally quoted in terms of 32nds of 1% of par. As a further illustration, the spread or basis between the cash price of the 2¾%-18 Treasury and the adjusted futures price was previously calculated at $814.46 per $100,000 face value (see Table 1). This translates into 26.063/32nds. The basis between the 2⅝%-20 Treasury and its adjusted futures price was $2,393.35 (also in Table 1), which equates to 76.587/32nds. This is summarized in Table 2.

TABLE 2

Calculating the Basis

| Security | 2-3/4%-18 Treasury | 2-5/8%-20 Treasury |
| --- | --- | --- |
| Cash Price | 99-022/32nds | 93-006/32nds |
| Futures Price | 118-25/32nds | 118-25/32nds |
| ×CF | 0.8272 | 0.7630 |
| Adjusted Futures Price | (98-082/32nds) | (90-202/32nds) |
| Basis in 32nds | 26.063/32nds | 76.587/32nds |

If one were to perform a similar analysis for all eligible for delivery securities against a particular Treasury futures contract, one may generally identify the CTD security as the security with the lowest or narrowest basis. To be more precise, the security with the highest Implied Repo Rate (IRR) may technically be considered cheapest to deliver. The IRR represents the rate of return associated with buying the basis, that is buying cash and selling futures, and liquidating the trade through the delivery process. This calculation accounts for all the cash flows associated with holding the security including periodic coupon payments coupled with the assumption that such coupon payments may be reinvested at prevailing rates. Typically one finds that the security with the lowest basis also has the highest IRR. Sometimes there are slight deviations to the extent that the basis calculation does not take into account all those cash flows. But examination of the basis is nonetheless a reasonably reliable method for determining the CTD.

When one "buys the basis," this implies that one buys spot Treasury securities and sells futures, generally in a ratio indicated by the conversion factor associated with the specific Treasury security in question. When one "sells the basis," this implies that one sells spot Treasury securities and buys futures, again, in a ratio indicated by the conversion factor. To illustrate, if one were to buy the basis based on the 2¾%-18 Treasury, one might buy $10 million face value of spot Treasuries and sell 83 futures by reference to the CF of 0.8272. If one were to sell the basis based on the 2⅝%-20 Treasury, one might sell $10 million face value of Treasuries and buy 76 futures by reference to the CF of 0.7630.

Treasury basis futures may be configured to call for the delivery upon maturity of a spot Treasury and a Treasury futures position. Thus, if one buys a Treasury basis futures contract and does not offset the position before contract maturity, one will take delivery of Treasury securities and accept a short futures position. Similarly, if one sells a Treasury basis futures contract, one is required to make delivery of Treasury securities and accept a long futures position.

Treasury basis futures contracts are associated with a specific Treasury security (i.e., having a specific coupon and maturity) and a specific Treasury futures contract. Like a normal Treasury basis trade, the transaction is weighted by reference to the CF. As an illustration, the Exchange may list a Treasury basis futures contract calling for delivery of $1 million face value of the 2¾%-18 Treasury coupled with an offsetting position in eight (8) [DATE] 10-year T-note futures, noting that the CF=0.8272, where "DATE" would be the specified maturity date of the futures contracts. As another illustration, the Exchange may list a Treasury basis futures contract calling for delivery of $1 million face value of the 2⅝%-20 Treasury coupled with an offsetting position in eight (8) [DATE] 10-year T-note futures, noting that the CF=0.7730, where "DATE" would be the specified maturity date of the futures contracts. The size of a cash Treasury security and the appropriate number of Treasury futures contracts may be scalable to provide for greater goodness of fit in the Treasury basis futures contract. As an illustration, an Exchange may list a Treasury basis futures contract calling for delivery of $10 million face value of the 2¾%-18 Treasury coupled with an offsetting position in eighty-three (83) [DATE] 10-year T-note futures, noting that the CF=0.8272, where "DATE" would be the specified maturity date of the futures contracts.

Treasury basis futures contracts may be configured to expire and provide for delivery at the conclusion of any day, week or month. They may be offered on electronic trading system such as exchange computer system 100. These contracts may be quoted as the basis in minimum increments of one-half of 1/32nd (or 1/64th). This equates to a minimum increment of $156.25 per $100,000 face value unit (=1/64th of 1% of $1,000,000).

Upon delivery of a spot Treasury position, a long could be required to wire transfer cash in an amount calculated by reference to the prevailing spot Treasury value as determined by the an exchange, and based upon a $1 million face value unit, plus accrued interest since the last semi-annual coupon payment date. The short can be required to transfer, through the Federal Reserve wire system, $1 million face value of the designated Treasury securities to the long.

The futures positions can be assigned to the long and short, respectively, at a price that reflects the final settlement price of the Treasury basis futures contract relative to the invoice price of the spot Treasury component of the delivery. In other words, the deliverable component final settlement value of the Treasury basis futures contract can be used to set the initial settlement value of the futures positions of the derivative component.

Subsequent to such assignment, the resulting Treasury futures contracts are subject to normal exchange mark-to-market (MTM) procedures. One may, of course, subsequently retain or liquidate the resulting spot Treasury and Treasury futures contracts through any ordinary means normally available.

Treasury Basis futures contracts can provide a means by which one may create a basis transaction through exchange facilities. This represents a way of "institutionalizing" basis trades which might previously have been transacted by "legging into" both the spot and futures positions individually or by relying upon a broker who may arrange for such transactions on behalf of the customer.

Conclusion

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. For example, one of ordinary skill in the art will appreciate that the steps illustrated in the illustrative figures may be performed in other than the recited order, and that one or more steps illustrated may be optional in one or more embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A method comprising;
receiving, at a computer system, a request specifying a type of basis derivative contract corresponding to one or more basis subject matters:
in response to the received request and at the computer system, and based on previously-stored type definition data corresponding to the specified type of basis derivative contract, generating and storing data corresponding to a created basis derivative contract of the specified type, the stored data including,
deliverable data identifying a future date and an obligation for delivery, on or by the future date, of one or more instances of at least one of the basis subject matters or a monetary value based on one or more instances of at least one of basis subject matters, and
derivative data identifying one or more types of future contracts, wherein each of the one or more types of futures contracts is based on at least one of the basis subject matters, the derivative data further identifying an obligation for acceptance, on or by the future date, of further contracts of the one or more types of futures contracts;
receiving, at the computer system data confirming satisfaction of the obligation for delivery; and
assigning, by the computer system and as result of receiving the data confirming satisfaction, an initial value to each of the one or more types of futures contracts.

2. The method of claim 1, futher comprising calculating a number of futures contracts.

3. The method of claim 1, wherein the deliverable data identifies an obligation to receive delivery on the future date and the derivative data identifies an obligation for acceptance on the future date of a short futures contractual obligation.

4. The method of claim 1, wherein the deliverable data identifies an obligation to provide delivery on the future date and the derivative, data identifies an obligation for acceptance on the future date of a long futures contractual obligation.

5. The method of claim 1, wherein
the one or more subject matters comprises a government-issued security,
the deliverable data identifies an obligation for delivery of at least one instance of the government-issued security, and the derivative data identifies an obligation for acceptance of a futures contract based on the government-issued security.

6. The method of claim 1, wherein
the one or more subject matters comprises a commodity,
the deliverable data identifies an obligation for delivery of a quantity of the commodity, and
the derivative data identifies an obligation for acceptance of a futures contract based on the commodity.

7. The method of claim 6, wherein the commodity is one of an agricultural commodity, an energy commodity or a metals commodity.

8. one or more non-transitory computer-readable media storing computer executable instructions that, when executed, cause a computer system to perform operations that include:
receiving a request specifying a type of basis derivative contract corresponding to one or more basis subject matters;
in response to the received, and based on previously-stored type definition data corresponding to the specified type of basis derivative contract, generating and storing data corresponding to a created basis derivative contract of the specified type, the stored data including
deliverable data identifying a future date and an obligation for delivery, on or by the future date, of one or more instances of at least one of the basis subject matters or a monetary value based on one or more instances of at least one of the basis subject matters, and
derivative data identifying one or more types of futures contracts, wherein each of the one or more types of futures contracts is based on at least one of the basis subject matters, the derivative data further identifying an obligation for acceptance, on or by the future date, of futures contracts of the one or more types of futures contracts;
receiving data confirming satisfaction of the obligation for delivery; and
assigning, as a result of receiving the data confirming satisfaction, an initial value to each of the one or more types of futures contracts.

9. The one or more non-transitory computer-readable media of claim 8, wherein the stored instructions further comprise instructions that, when executed, cause the computer system to perform operations that include:
calculating a number of futures contracts.

10. The one or more non-transitory computer-readable media of claim 8, wherein the deliverable data identifies an obligation to receive delivery on the future date and the derivative data identifies an obligation for acceptance on the future date of a short futures contractual obligation.

11. The one or more non-transitory computer-readable media of claim 8, wherein the deliverable data identifies an obligation to provide delivery on the future date and the derivative data identities an obligation for acceptance on the future date of a long futures contractual obligation.

12. The one or more non-transitory computer-readable media of claim 8, wherein
the one or more subject matters comprises a government-issued security,
the deliverable data identifies an obligation for delivery of at least one instance of the government-issued security, and
the derivative data identifies an obligation for acceptance of a futures contract based on the government-issued security.

13. The one or more non-transitory computer-readable media of claim 8, wherein
the one or more subject matters comprises a commodity,
the deliverable data identifies an obligation for delivery of a quantity of the commodity, and
the derivative data identifies an obligation for acceptance of a futures contract based on the commodity.

14. The one or more non-transitory computer-readable media of claim 13, wherein the commodity is one of an agricultural commodity, an energy commodity or a metals commodity.

15. A computer system comprising:
at least one processor; and
at least one non-transitory memory, wherein the at least one non-transitory memory stores instructions that, when executed, cause the computer system to perform operation that include
receiving a request specifying a type of basis derivative contract corresponding to one or more basis subject matters,
in response to the received request, and based on previously-stored type definition data corresponding to the specified type of basis derivative contract, generating and storing data corresponding to a created basis derivative contract of the specified type, the stored data including
deliverable data identifying a future date and an obligation for delivery, on or by the future date, of one or more instances of at least one of the basis subject matters or a monetary value based on one or more instances of at least one of the basis subject matters, and
derivative data. identifying one or more types of future contracts, wherein each of the one or more types of futures contracts is based on at least one of the basis subject matters, the derivative data futher identifying an obligation for acceptance, on or by the future date, of futures contracts of the one or more types of futures contracts,
receiving data confirming satisfaction of the obligation for delivery, and
assigning, as a result of receiving the data confirming satisfaction, an initial value to each of the one or more types of futures contracts.

16. The computer system Of daim 15, wherein the at least one non-transitory memory stores instructions that, when executed, cause the computer system to perform operations that include
calculating a number of futures contracts.

17. The computer system of claim 15, wherein the deliverable data identifies an obligation to receive delivery on the future date and the derivative data obligation for acceptance on the future date of a short futures contractual obligation.

18. The method of claim 15, wherein the deliverable data identities an obligation to provide delivery on the future date and the derivative data identifies an obligation for acceptance on the future date of a long futures contractual obligation.

19. The computer system of claim 15, wherein
the one or more subject matters comprises a government-issued security,
the deliverable data identifies an obligation for delivery of at least one instance of the government-issued security, and
the derivative data identifies an obligation tor acceptance of a futures contract based on the government-issued security.

20. The computer system of claim 15, wherein
the one or more subject matters comprises a commodity,
the deliverable data identifies an obligation for delivery of a quantity of the commodity, and
the derivative data identifies an obligation for acceptance of a futures contract based on the commodity.

21. The computer system of claim 20, wherein the commodity is one of an agricultural commodity, an energy commodity or a metals commodity.

\* \* \* \* \*